United States Patent
Yasuda et al.

(10) Patent No.: US 9,103,971 B2
(45) Date of Patent: *Aug. 11, 2015

(54) OPTICAL MODULE AND METHOD FOR PRODUCING THE SAME

(71) Applicant: Hitachi Metals, Ltd., Tokyo (JP)

(72) Inventors: Hiroki Yasuda, Tokyo (JP); Hiroshi Ishikawa, Tokyo (JP); Kouki Hirano, Tokyo (JP); Juhyun Yu, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/746,788

(22) Filed: Jan. 22, 2013

(65) Prior Publication Data

US 2013/0188907 A1 Jul. 25, 2013

(30) Foreign Application Priority Data

Jan. 24, 2012 (JP) ................................. 2012-012203

(51) Int. Cl.
 *G02B 6/36* (2006.01)
 *G02B 6/12* (2006.01)
 *G02B 6/42* (2006.01)

(52) U.S. Cl.
 CPC ............. *G02B 6/12* (2013.01); *G02B 6/4214* (2013.01); *G02B 6/4239* (2013.01); *G02B 6/4243* (2013.01); *Y10T 29/49993* (2015.01)

(58) Field of Classification Search
 CPC .......... G02B 6/4292; G02B 6/36; G02B 6/42; G02B 6/30
 USPC .................... 385/53, 88, 89, 90, 91
 See application file for complete search history.

(56) References Cited

U.S. PATENT DOCUMENTS 6,257,772 B1 7/2001 Nakanishi et al.
6,819,840 B2 * 11/2004 Tohgoh et al. ................. 385/49

(Continued)

FOREIGN PATENT DOCUMENTS

JP 2000-105327 A 4/2000
JP 2003-014946 A 1/2003

(Continued)

OTHER PUBLICATIONS

Japanese Office Action dated Jan. 6, 2015 with an English translation thereof.

(Continued)

*Primary Examiner* — Jennifer Doan
(74) *Attorney, Agent, or Firm* — McGinn IP Law Group, PLLC

(57) ABSTRACT

An optical module includes a substrate, an optical device including a surface-emitting or -receiving element mounted on a surface of the substrate with a light-emitting or -receiving portion, an optical fiber disposed parallel to the surface of the substrate and in a longitudinal direction of the substrate, a damming member provided between the optical device and the substrate to extend in a width direction of the substrate and dividing a gap between the optical device and the substrate in the longitudinal direction of the substrate into a first portion and a second portion, and a mirror provided at one side surface of the damming member a tip of the optical fiber. The first portion provided on an opposite side to the optical fiber is filled with an underfill resin, and the second portion provided on a side close to the optical fiber is filled with an optical fiber fixing resin.

10 Claims, 3 Drawing Sheets

(56) References Cited

U.S. PATENT DOCUMENTS

| | | |
|---|---|---|
| 7,905,663 B2 | 3/2011 | Yasuda et al. |
| 2009/0324171 A1 | 12/2009 | Yasuda et al. |

FOREIGN PATENT DOCUMENTS

| | | | |
|---|---|---|---|
| JP | 2003-207691 A | * | 7/2003 |
| JP | 2006-292852 A | | 10/2006 |
| JP | 2008-122721 A | | 5/2008 |
| JP | 2009-145817 A | | 7/2009 |
| JP | 2010-010254 A | | 1/2010 |

OTHER PUBLICATIONS

United States Office Action dated Mar. 12, 2014, in U.S. Appl. No. 13/746,767.

* cited by examiner

OPTICAL MODULE AND METHOD FOR PRODUCING THE SAME

The present application is based on Japanese patent application No. 2012-012203 filed on Jan. 24, 2012, the entire contents of which are incorporated herein by reference.

BACKGROUND OF THE INVENTION

1. Field of the Invention

The present invention relates to an optical module using an optical device comprising a surface-emitting element or a surface-receiving element. It also relates to a method for producing the optical module.

2. Description of the Related Art

In an optical module using an optical device comprising a surface-emitting element or a surface-receiving element, when the optical device is mounted on a substrate, an optical axis of the optical device is perpendicular to a surface of the substrate. Therefore, in order to optically connect an optical fiber disposed parallel to the surface of the substrate and the optical device together, a mirror is used to rotate the optical axis through 90 degrees.

As this type of optical module, there is conventionally known one in which the optical fiber and the optical device are optically connected together via an optical waveguide with a mirror formed by forming the optical waveguide on the substrate, and forming in the optical waveguide the mirror inclined at 45 degrees to the surface of the substrate (see e.g. JP-A-2010-10254 listed below).

Refer to JP-A-2010-10254, JP-A-2008-122721, JP-A-2009-145817, JP-A-2006-292852, and JP-A-2003-14946, for example.

SUMMARY OF THE INVENTION

However, there is a disadvantage in that the conventional optical module described above is costly, due to the use of the optical waveguide.

The inventors have studied an optical module with such a simple structure as to directly optically connect the optical device and the optical fiber together via the mirror, without the use of the optical waveguide and a lens.

This optical module is required to be shortened in a distance between a light-emitting portion or a light-receiving portion of the optical device and a tip of the optical fiber as much as possible, to suppress light loss. To this end, it is preferable to insert the tip of the optical fiber below the optical device (between the optical device and the substrate), to locate the tip of the optical fiber as close to the mirror as possible.

However, in such a structure, there is a disadvantage in that it is difficult to mount the optical device and the optical fiber, so that the production thereof is difficult.

For example, in the case of mounting the optical fiber after mounting (flip-chip mounting) the optical device on the substrate, it is necessary to insert and fix the optical fiber between the optical device and the substrate under the condition that the optical device is fixed to the substrate with only bumps for flip-chip mounting. As a result, due to the interference of the optical fiber with the optical device during the mounting of the optical fiber, the optical device may slip off the substrate. Incidentally, it is possible to reinforce the connection strength for the optical device to the substrate, thereby prevent the optical device from slipping off the substrate, by filling and curing an underfill resin between the optical device and the substrate after mounting the optical device on the substrate. However, in this case, the underfill resin is likely to flow to the position to mount the optical fiber, and the mounting of the optical fiber per se is likely to be difficult.

It is also conceivable to first mount the optical fiber, but in this case, in order to fix the optical fiber to the substrate, there arises the need to fill and cure an optical fiber fixing resin around the optical fiber, prior to mounting the optical device. This is likely to render it impossible to fill the sufficient underfill resin between the optical device and the substrate after mounting the optical device, to ensure the sufficient connection strength for the optical device to the substrate.

In view of the above circumstances, it is an object of the present invention to provide an optical module and a method for producing the same, which ensures sufficient connection strength for an optical device to a substrate, and low in cost and easy to produce.

(1) According to one embodiment of the invention, an optical module comprises:

a substrate;

an optical device comprising a surface-emitting element or a surface-receiving element mounted on a surface of the substrate with a light-emitting portion or a light-receiving portion located to face the surface of the substrate;

an optical fiber disposed parallel to the surface of the substrate, and in a longitudinal direction of the substrate;

a damming member provided between the optical device and the substrate to extend in a width direction of the substrate, the damming member dividing a gap between the optical device and the substrate in the longitudinal direction of the substrate into a first portion and a second portion; and a mirror provided at one side surface of the damming member to face the light-emitting portion or the light-receiving portion of the optical device and a tip of the optical fiber, and optically connect the optical device and the optical fiber, in which the first portion provided on an opposite side to the optical fiber with respect to the damming member is filled with an underfill resin, and the second portion provided on a side close to the optical fiber with respect to the damming member is filled with an optical fiber fixing resin.

In one embodiment, the following modifications and changes can be made.

(i) A length between an end of the damming member on the side close to the optical fiber and an end of the optical device on the opposite side to the optical fiber is preferably not less than 1/3 of a device length of the optical device.

(ii) A width of the damming member is preferably not less than a width of the optical device, (iii) The damming member may consist of a wiring pattern provided on the surface of the substrate, the mirror comprises one side surface of the damming member, and the one side surface of the damming member may be inclined to the surface of the substrate.

(iv) The substrate may comprise a film substrate comprising a wiring pattern on a front side and a back side, the film substrate may include an optical fiber receiving groove to receive the optical fiber and to be filled with the optical fiber fixing resin, and an underfill groove to be filled with the underfill resin, the damming member may comprise a portion of the film substrate which separates the optical fiber receiving groove from the underfill groove, and the mirror may comprise a metal film provided on one side surface of the damming member, and the one side surface of the damming member is inclined to the surface of the substrate.

(v) The underfill resin preferably reinforces connection strength for the optical device to the substrate.

(vi) A hardness of the optical fiber fixing resin after curing is preferably lower than a hardness of the underfill resin after curing.

(2) According to another embodiment of the invention, a method for producing an optical module with a substrate comprises:

preparing a substrate;

mounting an optical device comprising a surface-emitting element or a surface-receiving element on a surface of the substrate with locating a light-emitting portion or a light-receiving portion to face the surface of the substrate;

disposing an optical fiber parallel to the surface of the substrate, and in a longitudinal direction of the substrate; and providing a damming member between the optical device and the substrate to extend in a width direction of the substrate and divide a gap between the optical device and the substrate in the longitudinal direction of the substrate into a first portion and a second portion, providing a mirror at one side surface of the damming member to face the light-emitting portion or the light-receiving portion of the optical device and a tip of the optical fiber, and optically connect the optical device and the optical fiber;

filling the first portion provided on an opposite side to the optical fiber with respect to the damming member with an underfill resin; and filling the second portion provided on a side close to the optical fiber with respect to the damming member with an optical fiber fixing resin.

In another embodiment, the following modifications and changes can be made.

(i) After the optical device is mounted on the substrate, the underfill resin may be filled in the first portion and cured, and subsequently the optical fiber may be disposed on the substrate, and the optical fiber fixing resin may be filled in the second portion and cured.

(ii) After the optical fiber is disposed on the substrate, and the optical fiber fixing resin is filled in the second portion and cured, the optical device may be mounted on the substrate, and subsequently the underfill resin may be filled in the first portion and cured.

POINTS OF THE INVENTION

According to the present invention, it is possible to provide the optical module and the method for producing the same, which facilitates the mounting of the optical device, and which is easy to produce and low in cost.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Next, preferred embodiments according to the invention will be described below in conjunction with the accompanying drawings.

Figure 1A:
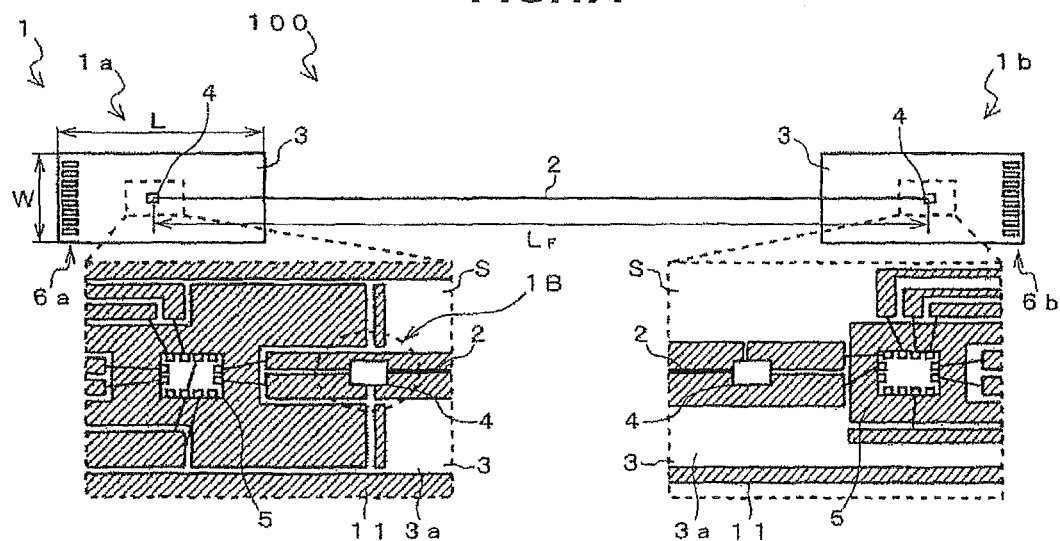
FIG. 1A is a plan view showing a cable with optical modules and an enlarged view showing an essential portion thereof in one embodiment according to the invention.
Figure 1B:
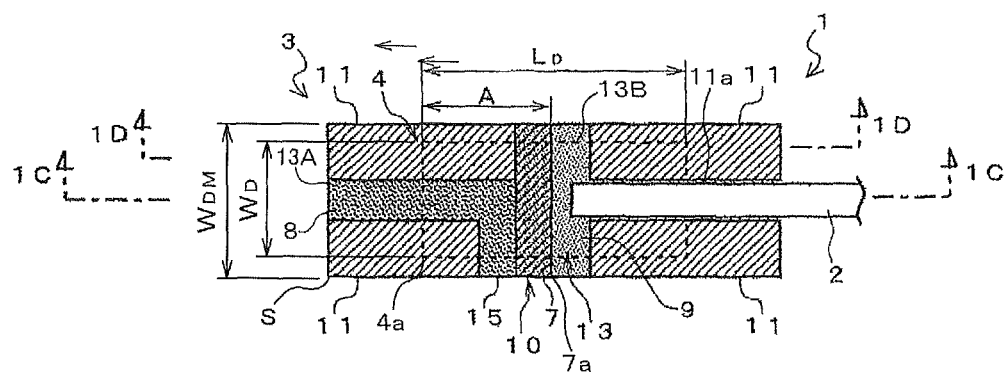
FIG. 1B is an enlarged view of a portion 1B in FIG. 1A.
Figure 1C:
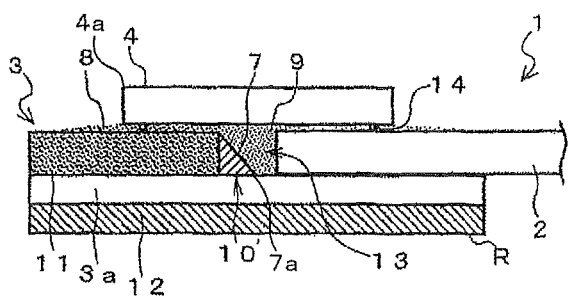
FIG. 1C is a cross-sectional view taken along line 1C-1C in FIG. 1B.
Figure 1D:
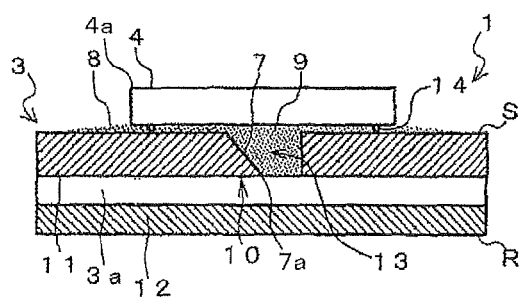
FIG. 1D is a cross-sectional view taken along line 1D-1D in FIG. 1B.

FIG. 1A is a plan view showing a cable with optical modules and an enlarged view showing an essential portion thereof in one embodiment according to the invention. FIG. 1B is an enlarged view of a portion 1B in FIG. 1A. FIG. 1C is a cross-sectional view taken along line 1C-1C in FIG. 1B. FIG. 1D is a cross-sectional view taken along line 1D-1D in FIG. 1B.

As shown in FIG. 1A, a cable 100 with optical modules includes and optical fiber 2 and optical modules 1 provided at both ends, respectively, of an optical fiber 2. One end (in the left side of FIG. 1A) of the optical fiber 2 is provided with the transmitting side optical module 1a, while the other end (in the right side of FIG. 1A) of the optical fiber 2 is provided with the receiving side optical module 1b.

The optical modules 1 (1a, 1b) includes a substrate 3, an optical device 4 comprising a surface-emitting element or a surface-receiving element mounted on a surface S of the substrate 3 with its light emitting portion or light receiving portion turned to the substrate 3 side, and an IC 5 electrically connected to the optical device 4. The optical fiber 2 is disposed parallel to the surface S of the substrate 3, and in a longitudinal direction (in the horizontal direction in FIG. 1A) of the substrate 3. A length L of the substrate 3 is e.g. 5 to 15 mm, and a width W of the substrate 3 is e.g. 2 to 5 mm. In addition, a length $L_F$ of the optical fiber 2 is e.g. 0.1 to 50 m.

In this embodiment, as the substrate 3, a flexible printed circuit board (FPC) formed with wiring patterns 11 and 12 on a surface S and a reverse surface R, respectively, of a film substrate 3a made of polyimide (see FIGS. 1C and 1D) is used. As the wiring patterns 11 and 12, a metal plating layer such as nickel plating, gold plating or the like formed over a copper surface is used.

In the transmitting side optical module 1a, as the optical device 4, the surface-emitting element such as a VCSEL (Vertical Cavity Surface Emitting Laser) or the like is used. As the IC 5, a driver IC is used for driving the optical device 4. At an end (at the left end in FIG. 1A) of the substrate 3 of the transmitting side optical module 1a, a plurality of connecting terminals 6a are formed to be aligned with each other.

The substrate 3 of the transmitting side optical module 1a is designed such that connecting terminals 6a are connected to the FPC connector provided on a body substrate (not shown) so that the substrate 3 of the transmitting side optical module 1a is mounted on the body substrate. An end of the body substrate is provided with an input connector such as a card edge connector or the like, so that its input connector is connected to a transmitting side external device (not shown). In the transmitting side optical module 1a, an electrical signal input through the input connector, the body substrate, the FPC connector and the connecting terminals 6a from the transmitting side external device is converted into an optical signal by the optical device 4, and outputted to the optical fiber 2.

On the other hand, in the receiving side optical module 1b, as the optical device 4, the surface-receiving element such as a PD (Photo Diode) or the like is used, and as the IC 5, an amplifier IC to amplify the electrical signal from the optical device 4 is used. At an end (at the right end in FIG. 1A) of the substrate 3 of the receiving side optical module 1b, a plurality of connecting terminals 6b are formed to be aligned with each other.

The substrate 3 of the receiving side optical module 1b is designed to connect connecting terminals 6b to the FPC connector provided on a body substrate (not shown) so that the substrate 3 of the receiving side optical module 1b is mounted on the body substrate. An end of the body substrate is provided with an output connector such as a card edge connector or the like, so that an output connector is connected to a receiving side external device (not shown). In the receiving side optical module 1b, an optical signal input from the optical fiber 2 is converted into an electrical signal by the optical device 4, and outputted via the connecting terminals 6b, the FPC connector, the body substrate, and the output connector to the receiving side external device.

The structure of the portion connecting the optical device 4 and the optical fiber 2 is described in detail below with reference to FIGS. 1B to 1D. In addition, FIGS. 1B to 1D show the enlarged view of the portion connecting the optical device 4 and the optical fiber 2 in the transmitting side optical module 1a, and the receiving side optical module 1b is also structured totally in the same way. Further, in FIG. 1B, the optical device 4 is indicated by a dashed line, and FIG. 1B shows the plan view when seen through the optical device 4.

As shown in FIGS. 1B to 1D, the optical module 1 includes a mirror 7 provided to face the light emitting portion of the optical device 4 and the tip of the optical fiber 2 and optically connect the optical device 4 and the optical fiber 2, an underfill resin 8 filled between the optical device 4 and the substrate 3 and cured to reinforce the connection strength for the optical device 4 to the substrate 3, and an optical fiber fixing resin 9 used to fix the optical fiber 2 to the substrate 3.

The optical device 4 is flip-chip mounted on the wiring pattern 11 with the use of bumps 14. The optical device 4 has electrodes (not shown) at four corners respectively in a bottom view, and the bumps 14 are provided in correspondence to the electrodes respectively. The coating around the tip of the optical fiber 2 is removed, and the bare wire thereof is mounted on the surface S of the substrate 3.

Now, the optical module 1 in this embodiment includes a damming member 10 provided between the optical device 4 and the substrate 3 to extend in the width direction (in the vertical direction in FIG. 1B) of the substrate 3 and partition (divide) the gap 13 between the optical device 4 and the substrate 3 in the longitudinal direction (in the horizontal direction in FIG. 1B) of the substrate 3. The mirror 7 is formed on one optical fiber 2 side of that damming member 10.

The damming member 10 is for defining a region (13A) to be filled with the underfill resin 8 and a region (13B) to be filled with the optical fiber fixing resin 9, so that the gap 13A on the opposite side (on the left side in FIG. 1B) to the optical fiber 2 with respect to the damming member 10 is filled with the underfill resin 8, while the gap 13B on the side close to the optical fiber 2 (on the right side in FIG. 1B) with respect to the damming member 10 is filled with the optical fiber fixing resin 9.

In this embodiment, as the damming member 10, the wiring pattern 11 formed on the surface S of the substrate 3 is used, and one side of the wiring pattern 11 used for the damming member 10 is inclined at 45 degrees to the surface S of the substrate 3 by processing (e.g., machining such as dicing or the like) to form the mirror 7.

In order to allow the insertion of the optical fiber 2 between the optical device 4 and the film substrate 3a, the distance between the optical device 4 and the film substrate 3a, i.e. the total thickness of the thickness of the wiring pattern 11 and the thickness of the bumps 14 is required to be not less than the outer diameter (i.e. cladding diameter) of the tip of the optical fiber 2. For example, when using the optical fiber 2 with the cladding diameter of 80 μm, as the wiring pattern 11, there may be used one whose copper layer thickness is on the order of 70 μm. The thickness of the film substrate 3a is 25 μm, for example.

It should be noted that in this embodiment, since the wiring pattern 11 is formed to be thick, this thick wiring pattern 11 formed is used to be configured to position the tip of the optical fiber 2. Specifically, the two wiring patterns 11 in the right side of FIG. 1B to be connected with the bumps 14 of the optical device 4 are formed to extend parallel in the longitudinal direction, and are configured to receive the tip of the optical fiber 2 in a gap 11a between the two wiring patterns 11, i.e., the gap 11a between the two wiring patterns 11 serves as an optical fiber receiving groove to receive the optical fiber 2.

In this embodiment, the two wiring patterns 11 in the left side of FIG. 1B to be connected with the bumps 14 of the optical device 4 are also formed to extend parallel in the longitudinal direction, and fill the gap between the two wiring patterns 11 with the underfill resin 8. Here, the left upper wiring pattern 11 in FIG. 1B is shown to be connected to the damming member 10, but the left upper wiring pattern 11 may be not connected to the damming member 10.

Further, in this embodiment, the resins 8 and 9 are filled from both sides in the longitudinal direction of the optical device 4 toward the damming member 10. In this case, for example, if the left lower wiring pattern 11 in FIG. 1B is connected to the damming member 10, the underfill resin 8 cannot escape during the filling, but is likely to pass through a small gap between the optical device 4 and the damming member 10 and overflow to the opposite side of the damming member 10. To avoid the occurrence of this event, it is necessary to form a vent 15 adjacent to the damming member 10 in the wiring pattern 11 to allow unnecessary resins 8 and 9 to escape in the width direction during the filling.

A length A of the optical device 4 between an end 4a of the optical device 4 on the opposite side of the optical fiber 2 with respect to the damming member 10 and an end 7a of the damming member 10 on the side close to the optical fiber 2 is preferably not less than ⅓ of the device length $L_D$ of the optical device 4. This is because if the length A is less than ⅓ of the device length $L_D$ of the optical device 4, the sufficient connection strength for the optical device 4 to the substrate 3 may be unable to be ensured due to the lessening of the area fixed by the underfill resin 8.

In addition, a width $W_{DM}$ of the damming member 10 is preferably not less than a width $W_D$ of the optical device 4. This is because if the width $W_{DM}$ of the damming member 10 is less than the width $W_D$ of the optical device 4, the underfill resin 8 or the optical fiber fixing resin 9 may, during the filling thereof, pass across the damming member 10 and enter the region 13B or 13A on the opposite side of the damming member 10.

The same resin or the different resins may be used as the underfill resin 8 and the optical fiber fixing resin 9, respectively. In addition, it is preferable that the underfill resin 8 which is relatively high in hardness after curing is used, so as to securely fix the optical device 4 to the substrate 3. On the other hand, the optical fiber fixing resin 9 which is for fixing the tip of the optical fiber 2 to the substrate 3 is not required to be as high in hardness as the underfill resin 8, because the tip of the optical fiber 2 is received in the gap between the wiring patterns 11. Moreover, it is preferable from the point of view of the lasting reliability of the optical module 1 that the optical fiber fixing resin 9 which is relatively low in hardness after curing is used, so as to serve to absorb the difference in linear expansion between the optical fiber 2 and the substrate 3. Therefore, for the ensuring of the sufficient connection strength for the optical device 4 to the substrate 3 and for the lasting reliability of the optical module 1, it is preferable that the underfill resin 8 and the optical fiber fixing resin 9 are the different resins respectively, so that the optical fiber fixing resin 9 is softer (lower in hardness after curing) than the underfill resin 8.

Next, a method for producing an optical module in the present embodiment will be described.

In the method for producing an optical module in the present embodiment, first, the substrate 3 comprising the film substrate 3a with the desired wiring patterns 11 and 12 on the front and back sides is produced, and the wiring pattern 11 used for the damming member 10 is formed with the mirror 7 by processing such as dicing or the like.

Figure 2A:
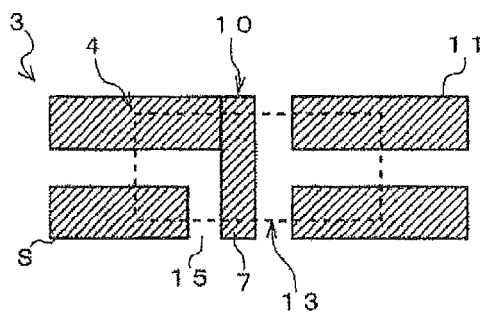
FIGS. 2A to 2C are diagrams for explaining a method for producing an optical module in one embodiment according to the invention.
Figure 2B:
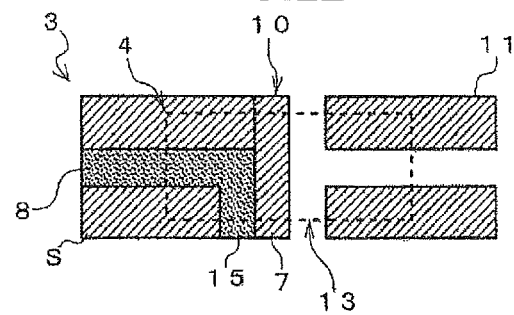

Thereafter, as shown in FIG. 2A, the optical device 4 is flip-chip mounted on the wiring pattern 11, and as shown in FIG. 2B, the region on the left side of the damming member 10 is filled with the underfill resin 8 to be cured.

Figure 2C:
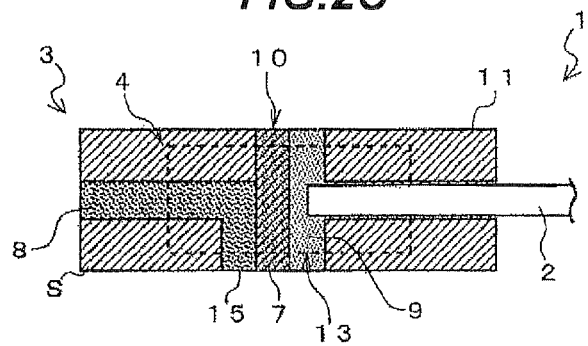

After the underfill resin 8 is cured, as shown in FIG. 2C, the tip of the optical fiber 2 is received in the gap between the two wiring patterns 11 in the right side of FIG. 2C, and the region on the right side of the damming member 10 is filled with the optical fiber fixing resin 9 to be cured.

Thereafter, the IC 5 is mounted on the substrate 3, and the substrate 3 is mounted via the FPC connector on the body substrate produced separately, resulting in the optical module 1 of the invention. In addition, providing the transmitting side optical module 1a and the receiving side optical module 1b to both the ends, respectively, of the optical fiber 2 results in the cable 100 with the optical modules as in FIG. 1A.

Incidentally, although herein it has been described that the optical device 4 is first mounted, the optical fiber 2 may first be mounted.

Figure 3A:
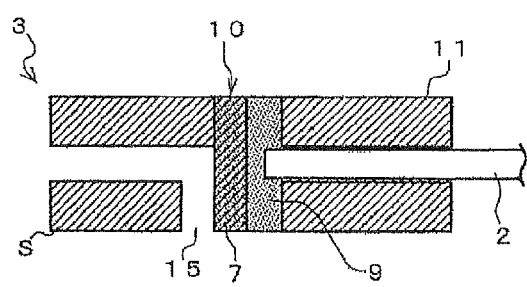
FIGS. 3A to 3C are diagrams for explaining a method for producing an optical module in one embodiment according to the invention.
Figure 3B:
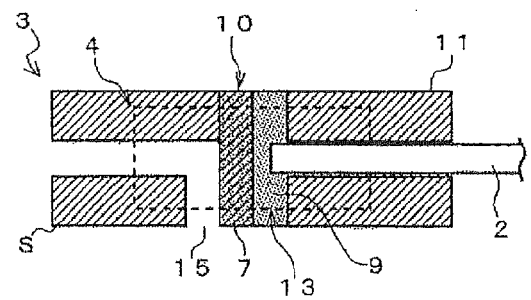
Figure 3C:
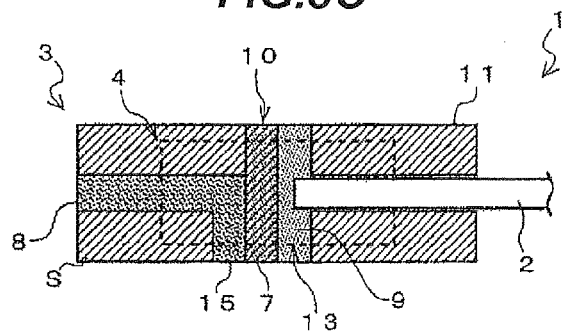

In this case, as shown in FIG. 3A, the tip of the optical fiber 2 is first received in the gap between the two wiring patterns 11 in the right side of FIG. 3A, and the region on the right side of the damming member 10 is filled with the optical fiber fixing resin 9 to be cured. Thereafter, as shown in FIG. 3B, the optical device 4 is flip-chip mounted on the wiring pattern 11, and as shown in FIG. 3C, the region on the left side of the damming member 10 is filled with the underfill resin 8 to be cured, resulting in the optical module 1 of the invention.

Incidentally, in the case where the optical fiber 2 is first mounted, in order to cure the optical fiber fixing resin 9 prior to the mounting of the optical device 4, the optical fiber fixing resin 9 does not contribute to the fixation of the optical device 4. On the other hand, in the case where the optical device 4 is first mounted, the optical fiber fixing resin 9 also serves as the underfill to fix the optical device 4 to the substrate 3, therefore allowing further enhancement of the connection strength for the optical device 4 to the substrate 3.

As described above, this embodiment includes the damming member 10 provided between the optical device 4 and the substrate 3 to extend in the width direction of the substrate 3 and partition (divide) the gap 13 between the optical device 4 and the substrate 3 in the longitudinal direction of the substrate 3 into the gaps 13A and 13B, so that one side surface of the damming member 10 on the side close to the optical fiber 2 is formed with the mirror 7, and the gap 13A on the opposite side to the optical fiber 2 with respect to the damming member 10 is filled with the underfill resin 8, while the gap 13B on the side close to the optical fiber 2 with respect to the damming member 10 is filled with the optical fiber fixing resin 9.

With this configuration, it is possible to facilitate the mounting of the optical device 4 and the optical fiber 2, and realize the optical module 1, which is easy to produce while ensuring the sufficient connection strength for the optical device 4 to the substrate 3.

Further, since the optical module 1 is configured to directly optically connect the optical device 4 and the optical fiber 2 together via the mirror 7, no optical waveguide and lens are required. The optical module 1 is therefore low in cost.

Further, in this embodiment, since the length A of the optical device 4 between the end 4a of the optical device 4 on the opposite side to the optical fiber 2 with respect to the damming member 10 and the end 7a of the damming member 10 on the side close to the optical fiber 2 is not less than ⅓ of the device length $L_D$ of the optical device 4, it is possible to ensure the sufficient region to be filled with the underfill resin 8, and to ensure the sufficient connection strength for the optical device 4 to the substrate 3, even if a soft resin is used for the optical fiber fixing resin 9.

Furthermore, setting the width $W_{DM}$ of the damming member 10 at not less than the width $W_D$ of the optical device 4 allows preventing the underfill resin 8 or the optical fiber fixing resin 9 from entering the region 13B or 13A on the opposite side of the damming member 10 during the filling, therefore enabling further facilitation of fabrication.

Incidentally, it is also conceivable to separately form the damming member 10 and the mirror 7, but in this case, there arises the problem that structure is complicated, and production is time-consuming. Integrally forming the damming member 10 and the mirror 7 allows for simplifying structure and facilitating production and further allows for miniaturization as well.

Next, another embodiment according to the invention will be explained.

Figure 4A:
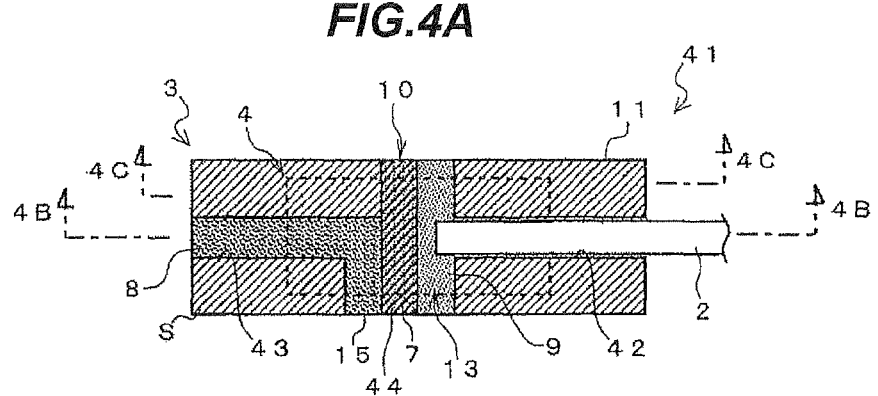
FIG. 4A is an enlarged view showing an essential portion of an optical module in another embodiment according to the invention.
Figure 4B:
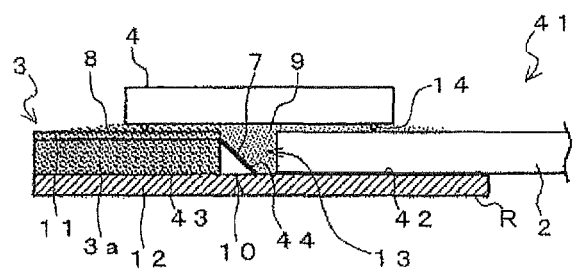
FIG. 4B is a cross-sectional view taken along line 4B-4B in FIG. 4A.
Figure 4C:
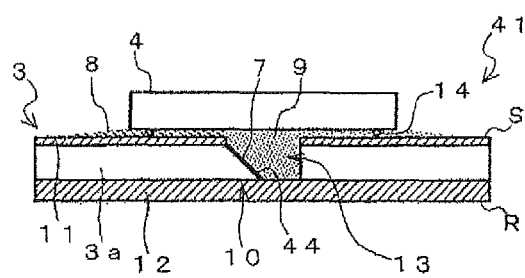
FIG. 4C is a cross-sectional view taken along line 4C-4C in FIG. 4A.

An optical module 41 shown in FIGS. 4A to 4C is designed to use a portion of the film substrate 3a for the damming member 10 in the optical module 1 of FIG. 1.

In the optical module 41, the substrate 3 in which the film substrate 3a is formed to be relatively thick is used, and the surface S of the film substrate 3a is formed with the relatively thin wiring pattern 11. For example, when using the optical fiber 2 with a cladding diameter of 80 μm, the substrate 3 with a thickness of the film substrate 3a of about 70 μm and a thickness of the wiring pattern 11 of about 10 μm may be used.

In the optical module 41, the film substrate 3a is formed with an optical fiber receiving groove 42 to receive the optical fiber 2 and to be filled with the optical fiber fixing resin 9, and is formed with an underfill groove 43 to be filled with the underfill resin 8, and the portion of the film substrate 3a that divides the optical fiber receiving groove 42 and the underfill groove 43 (the portion of the dividing wall that divides both the grooves 42 and 43) is used for the damming member 10.

The optical fiber receiving groove 42 is formed between the two wiring patterns 11 in the right side of FIG. 4A, while the underfill groove 43 is formed between the two wiring patterns 11 in the left side of FIG. 4A. An end on the side close to the damming member 10 of each of the grooves 42 and 43 is formed with the vent 15 to allow unnecessary resins 8 and 9 to escape in the width direction during the filling.

In addition, in the optical module 41, one side surface (i.e. A sidewall facing to the optical fiber receiving groove 42) of the damming member 10 (the portion of the film substrate 3a) is processed so as to be inclined to the surface of the film substrate 3a, and that inclined portion is formed with a metal film 44 by plating or the like, to form the mirror 7. As the metal film 44, a film made of e.g. copper may be used.

The optical module 41 can have the same function and advantage as those of the above-mentioned optical module 1, and allows for further thinning.

The invention is not limited to the above embodiments, but various alterations may naturally be made without departing from the spirit of the invention.

For example, although in the above embodiments it has been described that only one optical device 4 (i.e. one channel) is provided, an optical device array in which a plurality of the optical devices are arrayed may be used for multi-channelization. In this case, an optical fiber array in which a plurality of optical fibers are arrayed is used in place of the optical fiber 2.

Further, although in the above embodiments the wiring pattern 11 or the film substrate 3a is used for the damming member 10, the damming member 10 is not limited thereto, but may be configured so that the damming member 10 is formed separately from the substrate 3, and is attached to the substrate 3.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical module, comprising:
    a substrate;
    an optical device comprising a surface-emitting element or a surface-receiving element mounted on a surface of the substrate with a light-emitting portion or a light-receiving portion located to face the surface of the substrate;
    an optical fiber disposed parallel to the surface of the substrate, and in a longitudinal direction of the substrate;
    a damming member provided between the optical device and the substrate to extend in a width direction of the substrate, the damming member dividing a gap between the optical device and the substrate in the longitudinal direction of the substrate into a first portion and a second portion; and
    a mirror provided at one side surface of the damming member to face the light-emitting portion or the light-receiving portion of the optical device and a tip of the optical fiber, and optically connect the optical device and the optical fiber,
    wherein the first portion provided on an opposite side to the optical fiber with respect to the damming member is filled with an underfill resin, and the second portion provided on a side close to the optical fiber with respect to the damming member is filled with an optical fiber fixing resin.

2. The optical module according to claim 1, wherein a length between an end of the damming member on the side close to the optical fiber and an end of the optical device on the opposite side to the optical fiber is not less than 1/3 of a device length of the optical device.

3. The optical module according to claim 1, wherein a width of the damming member is not less than a width of the optical device.

4. The optical module according to claim 1, wherein the damming member consists of a wiring pattern provided on the surface of the substrate, the mirror comprises one side surface of the damming member, and the one side surface of the damming member is inclined to the surface of the substrate.

5. The optical module according to claim 1, wherein the substrate comprises a film substrate comprising a wiring pattern on a front side and a back side, the film substrate includes an optical fiber receiving groove to receive the optical fiber and to be filled with the optical fiber fixing resin, and an underfill groove to be filled with the underfill resin, the damming member comprises a portion of the film substrate which separates the optical fiber receiving groove from the underfill groove, and the mirror comprises a metal film provided on one side surface of the damming member, and the one side surface of the damming member is inclined to the surface of the substrate.

6. The optical module according to claim 1, wherein the underfill resin reinforces connection strength for the optical device to the substrate.

7. The optical module according to claim 1, wherein a hardness of the optical fiber fixing resin after curing is lower than a hardness of the underfill resin after curing.

8. A method for producing an optical module with a substrate, comprising:
    preparing a substrate;
    mounting an optical device comprising a surface-emitting element or a surface-receiving element on a surface of the substrate with locating a light-emitting portion or a light-receiving portion to face the surface of the substrate;
    disposing an optical fiber parallel to the surface of the substrate, and in a longitudinal direction of the substrate; and
    providing a damming member between the optical device and the substrate to extend in a width direction of the substrate and divide a gap between the optical device and the substrate in the longitudinal direction of the substrate into a first portion and a second portion,
    providing a mirror at one side surface of the damming member to face the light-emitting portion or the light-receiving portion of the optical device and a tip of the optical fiber, and optically connect the optical device and the optical fiber;
    filling the first portion provided on an opposite side to the optical fiber with respect to the damming member with an underfill resin; and
    filling the second portion provided on a side close to the optical fiber with respect to the damming member with an optical fiber fixing resin.

9. The method according to claim 8, wherein after the optical device is mounted on the substrate, the underfill resin is filled in the first portion and cured, and subsequently the optical fiber is disposed on the substrate, and the optical fiber fixing resin is filled in the second portion and cured.

10. The method according to claim 8, wherein after the optical fiber is disposed on the substrate, and the optical fiber fixing resin is filled in the second portion and cured, the optical device is mounted on the substrate, and subsequently the underfill resin is filled in the first portion and cured.

* * * * *